«12» United States Patent
Harris

«10» Patent No.: US 7,198,042 B2
«45» Date of Patent: Apr. 3, 2007

«54» APPARATUS FOR CUTTING A MITERED EDGE IN STONE

«76» Inventor: K. Michael Harris, 9275 Curbaril Ave., Atascadero, CA (US) 93422

«*» Notice: Subject to any disclaimer, the term of this patent is extended or adjusted under 35 U.S.C. 154(b) by 0 days.

«21» Appl. No.: 11/145,257

«22» Filed: Jun. 3, 2005

«65» Prior Publication Data

US 2005/0268897 A1    Dec. 8, 2005

Related U.S. Application Data

«60» Provisional application No. 60/576,725, filed on Jun. 3, 2004.

«51» Int. Cl.
B28D 1/04 (2006.01)

«52» U.S. Cl. .................. 125/13.01; 125/14; 125/16.04; 83/455; 83/468.3; 83/745

«58» Field of Classification Search .......... 125/12, 125/13.01, 14, 16.04, 35; 451/439; 269/1, 269/97, 303; 83/468.3, 455, 471.2, 471.3, 83/743, 745
See application file for complete search history.

«56» References Cited

U.S. PATENT DOCUMENTS

| 4,446,760 | A | * | 5/1984 | Denham | ........................ | 76/79 |
| 5,054,352 | A | * | 10/1991 | Fushiya et al. | ............ | 83/468.3 |
| 5,142,825 | A | | 9/1992 | Floyd | | |
| 6,257,225 | B1 | * | 7/2001 | Harris | ..................... | 125/13.01 |
| 6,702,659 | B1 | * | 3/2004 | Moncrieff et al. | .......... | 451/358 |
| 6,712,061 | B1 | * | 3/2004 | Kalb | ............................ | 125/10 |
| 2003/0131839 | A1 | * | 7/2003 | Steiner et al. | ........... | 125/13.01 |
| 2005/0098010 | A1 | * | 5/2005 | Hu | ............................. | 83/471.2 |
| 2005/0257657 | A1 | * | 11/2005 | Lee | ............................... | 83/581 |

OTHER PUBLICATIONS

Article entitled, "Logosol M7 Portable Saw Mill" in 3 pages; http://www.right-tool.com/logm7porsawm.html; downloaded on Aug. 3, 2005.
Article entitled, "Ripsaw Portable Bandsaw Sawmill" In 5 pages; http://www.right-tool.com/noname22.html; downloaded on Aug. 3, 2005.

* cited by examiner

Primary Examiner—Eileen P. Morgan
«74» Attorney, Agent, or Firm—Knobbe, Martens, Olson & Bear LLP

«57» ABSTRACT

A system for supporting and positioning a portable stone-cutting track saw to make a mitered cut in a piece stone-type material is described. The system includes lightweight support fixtures that clamp to the stone and that are configured to support rails of the portable track saw system at a desired angle, for example, approximately 45°, or at a variety of angles, with respect to the stone. In one preferred embodiment, two end support fixtures clamp on to ends of the stone and are configured to support track saw rails at an angle of 46° with respect to a horizontal surface of the stone. The system may also comprise one or more types of inline support fixtures for supporting a central portion of the rails when the rails are very long or use of end support fixtures is inconvenient, and a depth-stop mechanism for enhancing repeatability of the mitered cuts.

18 Claims, 5 Drawing Sheets ically with a series of
APPARATUS FOR CUTTING A MITERED EDGE IN STONE

PRIORITY CLAIM

The present application claims priority benefit under 35 U.S.C. 119(e) from U.S. Provisional Application No. 60/576,725, entitled APPARATUS FOR CUTTING BEVELED EDGE IN STONE, filed Jun. 3, 2004, which is hereby incorporated herein by reference in its entirety.

FIELD OF THE INVENTION

The present invention relates to an apparatus and method for cutting or sawing a slab of material, such as stone, and, more particularly, for cutting the material at an angle.

BACKGROUND OF THE INVENTION

Systems that allow for on-site, precision cutting of granite, marble, and other stone-type materials, such as for building cladding, countertops and stairways, are very desirable, in part because they help eliminate the inefficiency and potential inaccuracy that can be introduced into a job when stone cuts must be done with large specialized equipment, typically in a stone factory or workshop. It has proven desirable to have a track saw system in which the tracks rest directly on the stone being cut, thus taking advantage of the natural rigidity of the stone and characteristic flatness of stone slabs being used for counter tops and similar jobs, to omit the unnecessary and often extreme extra weight and bulk of additional equipment. In particular, the AccuGlide saw system, described by the Applicant in U.S. Pat. No. 5,960,780, provides a lightweight, highly portable, and affordable system in which a stone-cutting saw, with a circular blade that is configured to be substantially perpendicular to a base of the stone-cutting saw, is guided along a set of tracks that rest on the stone workpiece.

Until now, however, a successful system has not been made available for making cuts in the workpiece at other than 90° angles at the job site. Making such angled cuts, known as mitering, beveling, or chamfering, is an important and frequently needed task for professional stoneworkers. In particular, no analogous track saw system has been developed to allow rails of a track saw system to be supported by the stone being miter cut without reliance on additional, very heavy, and non-portable equipment. Instead, most mitering of workpiece edges is currently done off-site, with on-site portions of the job being carried out using hand tools such as a hand grinder that grinds away the unwanted stone in an operation that, due in part to the inconsistent crystalline structure of natural stone, is prone to rippling and other inaccuracies. Mitering by grinding the stone with a power router as opposed to cutting the stone with a diamond saw is typically far more costly in terms of time and wear-and-tear on the equipment used, as well being more physically stressful to the stone-worker's body. In fact, it is currently estimated that for a typical kitchen countertop job, less than 25% of the labor costs involve cutting the stone, while 60–75% of the labor costs involve finishing the edges of the stone, including templating, laminating, hand-shaping, and polishing operations.

Attempts to adapt existing portable mitering saw systems and methods, such as those designed for use with wood and other softer and lighter-weight materials, have thus far not been successful for a number of reasons. For one thing, because of the far greater demands made on the blade used for stonecutting, whether for straight or angled cuts, a step-cut type of operation is preferred for cutting stone, in which a desired cut is made incrementally with a series of successively deeper cuts in the stone, for example, at ¼" deeper per pass. This step-cut method makes accurate repeatability of the angle of a cut much more crucial for stonework than for woodwork, especially if the final angled edge is to be smooth and ridge-free. Due in part to this higher demand for angle repeatability, tilting the motor and blade of the saw with respect to the base of the saw, as can be done with the less-rigid SKIL™ saw designs used for wood cutting, does not work well for stone-cutting saws.

Although traditional tooling with very large, heavy, non-portable, and expensive pieces of machinery, such as a gantry saw, bridge saw, or computer numeric control (CNC) saw, may provide for cleanly mitered cuts in stone slabs, such systems may typically cost up to hundreds of thousands of dollars each, and, at 12–14 feet long, do not provide the portability so desired by stoneworkers for on-site jobs.

SUMMARY OF THE INVENTION

What is described is a miter support system that can adapt a lightweight, portable stone-cutting track saw system so that a blade, such as a diamond blade, of the stone-cutting track saw is positioned to make a mitered cut along an edge of a stone slab, such as a slab of polished granite or marble for making a kitchen countertop. The miter support system includes support fixtures that clamp directly to the stone slab and that provide support for a set of rails of a track saw system, which are thereby positioned at a desired angle with respect to the planar surface of the stone slab. The rails, in turn, support and guide the stone-cutting track saw to make the mitered cut. In one preferred embodiment, two end support fixtures clamp on to end portions of the stone and are configured to support track saw rails at an angle of approximately 45°, for example 46°, with respect to a horizontal surface of the stone. In other embodiments, the miter support system supports and positions the rails at another desirable, fixed angle, or at one of a variety of selectable angles. The system is thus able to greatly reduce the time and wear-and-tear on machinery expended for finishing the edges of the stone slabs, thereby also greatly reducing the costs involved in such operations.

The system may also comprise one or more types of inline support fixtures for supporting a central portion of the rails when the rails are very long, such as over seven feet long, or when two end support fixtures cannot conveniently be clamped onto ends of the stone workpiece. Furthermore, in a preferred embodiment, some or all of the fixtures include a depth-stop mechanism that allows for enhanced repeatability of mitered cuts so that, for jobs comprising multiple stone workpieces, miter cuts of consistent depth and placement may easily be made using the miter support system.

Thus, the miter support system described herein allows for consistent, high-quality miter cuts to be made in stone workpieces using an easily portable system that can be used at the job site. Furthermore, the system may be used to adapt a stone-cutting track saw system for making flat 90° cuts, that an operator may already own, in order to expand the operator's on-site capabilities to include making miter cuts.

An embodiment of a guide system for supporting a stone-cutting saw to make mitered cuts in stone is described. The guide system comprises one or more rails that guide the movement of the stone-cutting saw and a fixture system that supports the stone-cutting saw on and at an angle with respect to a piece of stone so that the stone-cutting saw can make a mitered cut at a desired angle in the piece of stone as the stone-cutting saw moves along the one or more rails.

An embodiment of an apparatus for guiding a saw to make an angled cut into a stone workpiece is described. The apparatus comprises at least one end support fixture configured to clamp onto an edge of the stone workpiece, wherein the end support fixture is further configured to support a set of rails for supporting and guiding the saw at a desired angle with respect to the plane of the stone workpiece.

An embodiment of a set of support fixtures for use with a stone-cutting saw is described, wherein the stone-cutting saw makes cuts in stone while being guided along a set of rails, and wherein a blade used by the stone-cutting saw is circular and is configured to remain perpendicular with respect to a base of the stone-cutting saw. The set of support fixtures comprises at least one clamp for clamping a support fixture to a piece of stone, and at least one support surface for supporting at least a portion of the set of rails at an angle with respect to the piece of stone such that the blade of the stone-cutting saw is positioned to make a mitered cut in the piece of stone as the stone-cutting saw is guided along the set of rails.

An embodiment of a method for making a mitered cut in a piece of stone is described. The method comprises mounting a set of rails on the piece of stone such that the rails are near an edge of the piece of stone and are positioned at an incline with respect to the piece of stone, and guiding a stone-cutting saw along the rails such that a blade of the stone-cutting saw is positioned by the incline to make a mitered cut in the edge of the piece of stone.

Neither this summary nor the following detailed description defines the invention. The invention is defined by the claims.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENT

A miter support system for supporting a portable stone-cutting track saw to make a mitered cut in a piece of stone or stone-type material is described. The portable track saw system may be one such as is described in U.S. Pat. No. 5,960,780 and U.S. Pat. No. 6,257,225, both incorporated herein in their entireties by reference, in which two rails, also known as tracks, are laid directly on a planar surface of a stone slab for guiding a circular blade of a track saw as it cuts the stone. Using the miter support system, the rails are supported in an angled position with respect to a surface of the stone slab by a set of support fixtures that are clamped to the stone slab. Furthermore, the support fixtures are positioned so that a stone-cutting track saw that is guided by the angled rails can make a miter cut in the stone slab, typically along an edge of the stone slab.

The miter support system, in conjunction with the track saw, is used most commonly for making miter cuts in stone and stone-type materials, including, but not limited to, granite, marble, flagstone, sandstone, limestone, slate, composite stone, and reconstituted stone, including reconstituted quartz. However the miter support system described herein may also be used to assist in making miter cuts in other hard and brittle materials, such as resin, plastic, and/or glass. Thus, as used herein, the terms "stone," "stone slab," "stone-type material," and "workpiece" refer to any piece of hard and brittle material to be miter-cut by a saw that is supported directly or indirectly by the miter support system.

Figure 1:
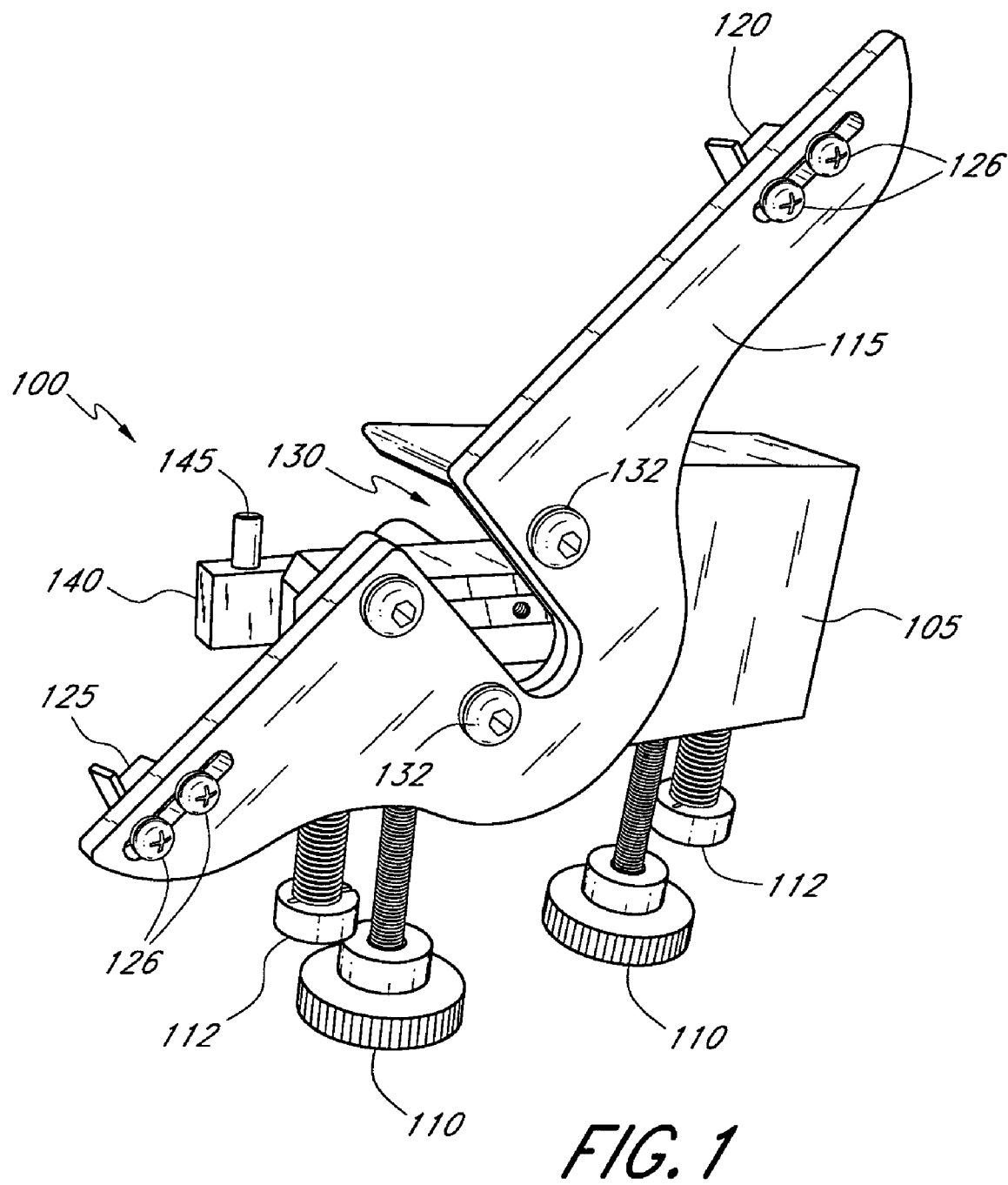
FIG. 1 depicts a first view of one embodiment of an end support fixture for the miter support system.

FIG. 1 depicts a first view of one embodiment of an end support fixture 100 for the miter support system. In this embodiment, the end support fixture 100 includes a fixture support block 105 that is configured to clamp on to a slab of stone using two main screw knobs 110 and two positioning rods 112, as will be described in greater detail with reference to FIG. 2. The view of the end support fixture 100 depicted in FIG. 1 shows what might be called an "outside" view, because this side of the end support fixture 100 faces away from the end of the stone slab and is easily visible when the end support fixture 100 is clamped onto the stone slab.

The end support fixture 100 also includes an angled bracket plate 115. An upper rail support 120 and a lower rail support 125 are attached to the angled bracket plate 115 and are each configured to support a rail, or track, of a track saw system using gravity. As is described in the U.S. Pat. No. 6,257,225 and U.S. Pat. No. 5,960,780, the track saw system typically includes horizontal wheels to laterally restrain the saw base on the rails, which will be described in greater detail with reference to FIG. 3. Therefore, it is often desirable to support the rails on supports 120, 125 in such a way that the wheels of the track saw are able to roll past the supports 120, 125. In one embodiment, as depicted in FIG. 1, this is accomplished by providing supports 120, 125 that are small L-brackets having a main body attached to the angled bracket plate 115 and a hanger portion extending at 90° from the main body to support the rails using gravity. An undersurface layer of neoprene or other similar material that is used with some track saw system rails negates possible lateral movement of the rails on the supports 120, 125. The hanger portions of the L-brackets are generally configured to allow sufficient space for the wheels, which extend downwards from the saw base, to pass by. In some embodiments, the hanger portions extend about half the thickness of the rails, and in another embodiment, the hanger portions extend less than about half the thickness of the rails.

As can be seen in FIG. 1, some embodiments of the fixture support block 105 include screws 126 that may be loosened and/or tightened for adjusting the positions of the upper rail support 120 and the lower rail support 125 with respect to one another along slots provided for that purpose to accommodate track saw systems with varying desired distances between the tracks. In other embodiments, the upper rail support 120 and the lower rail support 125 may be formed integrally with the angle bracket plate 115 and or may otherwise not be adjustable. In still other embodiments, the upper rail support 120 and the lower rail support 125 may be adjustable using mechanisms other than the slot and screw mechanism of FIG. 1.

The angled bracket plate 115 also includes a saw blade slot 130 for accommodating a saw blade, such as a circular diamond saw blade, as the saw is guided along the tracks for making the miter cut in the stone slab. In the embodiment shown in FIG. 1, the angled bracket plate 115 is configured to support the track saw system such that the saw blade makes a mitered cut at a fixed desired angle with respect to a plane defined by a surface of the stone slab. For example, a mitered cut of approximately 45° is commonly used in stone-cutting jobs, and a miter support system that is configured to allow a track saw to make cuts of approximately 45° is desirable. Since the track saw is generally configured to make a cut that is perpendicular to a plane in which the rails lie, supporting the rails at about 45° to the horizontal allows a user to cut the stone slab at an angle complementary to the angle at which the rails are supported (that is, about 45° in the above example.)

In some embodiments, it is desirable to support the rails at an angle slightly greater than or less than 45°, in order to allow additional space in which an adhesive or sealing substance can be accommodated. Thus, in some embodiments, the angle can be between about 40° and about 50°.

In one preferred embodiment, the angle bracket plate 115 is configured to support the rails and the saw at an angle of 46°. Thus, after mitering, the edge of the stone slab retains an angle of 44°. When two mitered stone edges of 44° are joined at their edges, a small gap is left open at an interior portion of the join, which can advantageously accommodate glue or other adhesive that may be used to hold the two mitered stone edges together. However, as will be clear to one of skill in the art, in some applications, a miter support system that supports a track saw system to make cuts at any of a variety of other fixed or adjustable angles may also be advantageous. Furthermore, in another preferred embodiment, the miter support system is configured to adjustably allow the angled bracket plate 115 and the upper and lower rail supports 120, 125 to support the track saw system at a variety of selectable angles with respect to a horizontal surface of a stone slab being cut. For example, in one embodiment, the bolts 132 may pass through any of a plurality of holes in the plates 115 (not shown) to provide angular adjustments.

Figure 2:
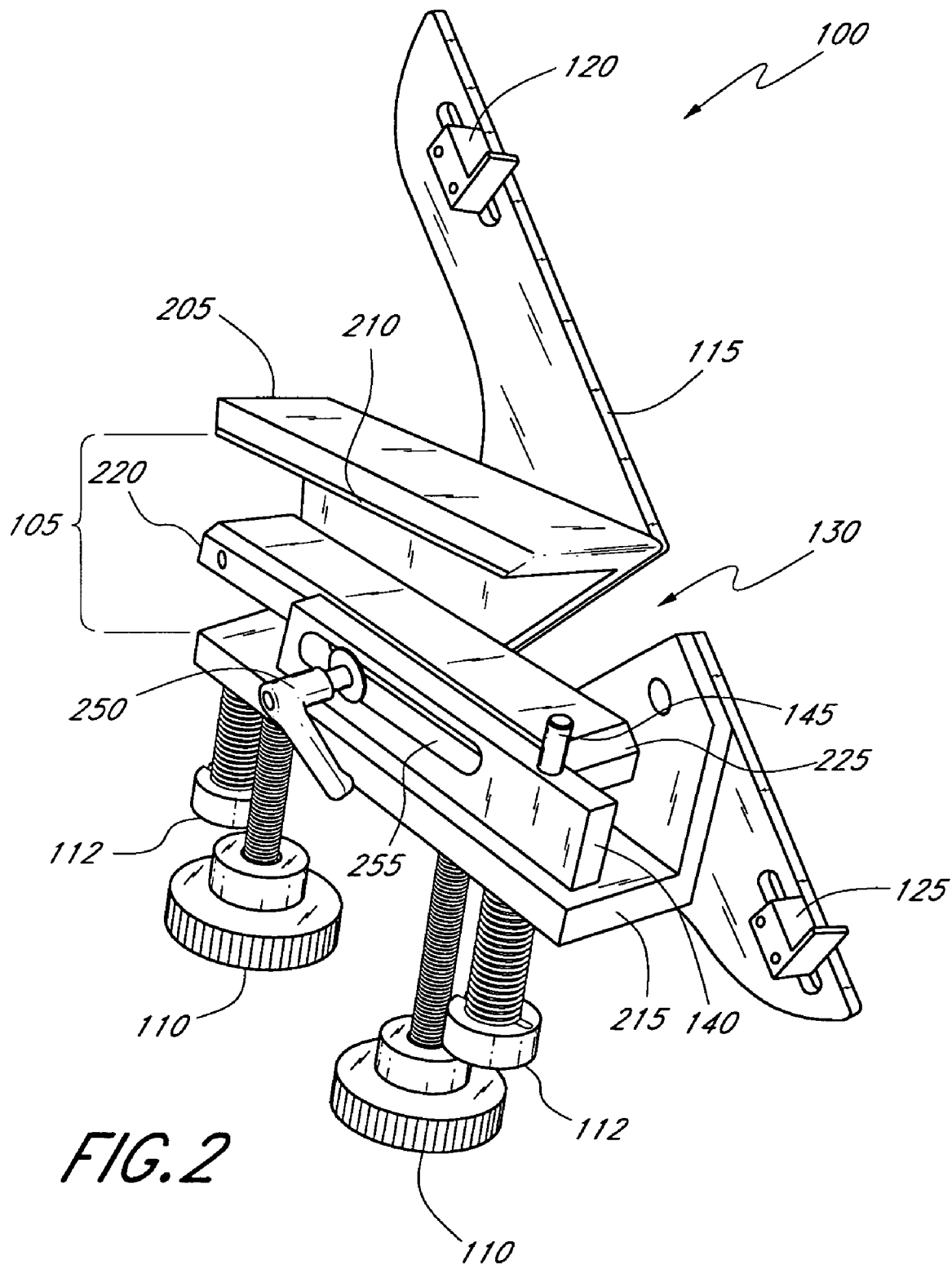
FIG. 2 depicts a second view of the embodiment of the end support fixture for the miter support system shown in FIG. 1.

In the fixed-angle embodiment shown in FIG. 2, the angled bracket plate 115 is attached to the fixture support block 105 behind it using three bolts 132. In other fixed-angle embodiments, the angled bracket plate 115 is attached to the fixture support block 105 using other methods, or the angled bracket plate 115 and the fixture support block 105 may be formed integrally as a single unit, or other methods may be used for providing the functions of the angled bracket plate 115 and the fixture support block 105, as will be familiar to one of skill in the art after reading this disclosure.

Also viewable in FIG. 1 is a depth stop mechanism 140 and a depth stop pin 145, which will be described with reference to FIG. 2.

FIG. 2 depicts a second view of the embodiment of the end support fixture 100 shown in FIG. 1. This view depicts what might be called the "inside" view of the end support fixture 100, because this side of the end support fixture 100 faces in towards and comes in contact with the end of the stone slab when the end support fixture 100 is clamped onto the stone slab. Thus, this side is not fully or easily visible during use.

FIG. 2 presents a clearer and more detailed view of the fixture support block 105 portion of the end support fixture 100. The fixture support block 205 includes an upper support plate 205 and a lower support plate 215. The upper support plate 205 has a lower surface that, in a preferred embodiment, is covered with a thin cushion layer 210 of neoprene material or other elastomer that protects an upper surface of the stone slab receiving the miter cut and that also provides a degree of friction between the stone slab and the end support fixture 100 in order to minimize slippage of the stone slab or the end support fixture 100 with respect to one another. Using a resilient elastomer that is not totally rigid also provides the advantage of allowing the end support fixture 100 to be clamped to the stone slab, even to one with a highly polished marble surface, using less pressure than would be needed to clamp another hard surface directly to the stone. Furthermore, the thin cushion layer 210 is sufficiently thin to avoid changing the planar relationship of the upper support plate 205 and the stone slab; thus, the accuracy of positioning the stone slab is maintained for allowing a mitered cut to be made at the desired angle. In other embodiments, the thin cushion layer 210 may be formed of another suitable material, as will be familiar to a practitioner of skill in the art, or the thin cushion layer 210 may be omitted.

In between the upper support plate 205 and the lower support plate 215, a clamp plate 220 is supported on threaded portions of the two main screw knobs 110 and on the two positioning rods 112, all four of which project through holes formed in the lower support plate 215. In a preferred embodiment, the clamp plate 220 is sufficiently long, for example, approximately six inches long, such that the clamp plate 220 may be used to clamp and support both a relatively thin piece of stone to be mitered, for use as a facing around a mitered edge of a counter top, for example, as well as a larger piece of stone that may be used behind the thin piece, to brace and support the thin piece during cutting, and to thereby protect the thin piece from breaking. In this way, even thin stone pieces that are typically already factory-polished on one side can be successfully mitered at the worksite for use as facing pieces, thereby reducing on-site finish polishing for providing an acceptable finish to just a very narrow seam of approximately ⅛"–¼ where the two mitered pieces are joined.

A thick cushion layer 225, of neoprene or other suitable material, is formed on an upper surface of the clamp plate 220. The thick cushion layer 225 cushions a bottom surface of the stone slab being cut, and, as was described with reference to the thin cushion layer 210, allows the end support fixture 100 to be clamped to the stone slab with a reduced amount of pressure. Furthermore, the thick cushion layer 225 provides a surface that can be cut by the saw without damaging the blade of the saw. In order to achieve a clean cut, an operator may position the blade to extend slightly (for example, about ⅛") below the bottom surface of the stone slab, thereby cutting into the thick cushion layer 225 slightly.

By turning the knob portions of the two main screw knobs 110, the clamp plate 220 is raised or lowered with respect to the thin cushion layer 210 of the upper support plate 205. Furthermore, the two positioning rods 112, which are spring-loaded, assist the action of the main screw knobs 110 and help to stabilize positioning of the clamp plate 220. As the main screw knobs 110 are tightened, the springs of the positioning rods 112 are compressed. When the main screw knobs 110 are loosened, the compressed springs are allowed to expand and assist in retracting the clamp plate 220 from the stone piece, as will be familiar to one of skill in the mechanical arts. Thus, the end support fixture 100 may be adjusted to firmly clamp on to the end portions of stone slabs of varying thicknesses.

Miter cuts, even those made at the same angle, may present different visual and functional characteristics based on a variety of factors, including, but not limited to, the position of the cut with respect to the end of the stone slab. Different such positionings can, for example, produce mitered cuts with blunt ends or that only cut away a portion of a stone's flat edge. It is generally desirable to be able to reliably repeat the characteristics of a given mitered cut, especially on multiple slabs of stone used for a given job.

The miter support system described herein is preferably allows substantial repeatability of blade positioning, in order to allow a user to cut a bevel of a consistent angle and depth on multiple pieces of stone. In the embodiment depicted in FIG. 2, this feature is provided by the depth stop mechanism 140 of the end support fixture 100, which includes the depth stop pin 145 and a depth stop adjustment slot 255. A depth stop handle 250, which is attached to the clamp plate 220, extends through the depth stop adjustment slot 255. The depth stop handle 250 holds the depth stop mechanism 140 firmly against the clamp plate 220. The depth stop handle 250 may be tightened or loosened by rotating the handle 250, thus allowing the depth stop mechanism 140 with its depth stop pin 225 to be slid forward or backward linearly along the depth stop adjustment slot 255 and with respect to the clamp plate 220. alternatively, the depth stop pin 145 may be adjusted by any other suitable means.

In use, the end support fixture 100 is placed at one end of a stone slab along an edge that is perpendicular to the edge to be mitered. Thus, with respect to the embodiment depicted in FIG. 2, the stone slab edge that is to be mitered is inserted between the upper support plate 205 and the clamp plate 220, beginning at the end of the upper support plate 205 and clamp plate 220 that is farthest from the depth stop pin 245. An operator clamps two end support fixtures 100 at desired locations (which can be determined by using a calibration instrument described in U.S. Pat. No. 6,257,225 and U.S. Pat. No. 5,960,780), and then the depth stop pins 145 can be adjusted to contact the edge of the first stone workpiece and then locked in position. After cutting a desired edge in the first workpiece, the depth stop pins 145 may be left in their set and locked positions, and the end support fixtures 100 can be removed from the workpiece.

The end support fixtures 100 may then be placed on a second workpiece in order to cut a second mitered cut at substantially the same position with reference to the edge of the workpiece as the first. As the end support fixture 100 is slid back over the second stone slab, the edge of the second slab to be mitered approaches, and eventually contacts, the depth stop pin 145, thereby halting further forward movement of the stone slab with respect to the end support fixture 100 and positioning the second slab to receive substantially the same mitered cut as did the first slab. The main screw knobs 110 may then be tightened, firmly compressing the clamp plate 220 against an underside of the stone slab, and thereby firmly attaching the end support fixture 100 in position with the slab.

The depth stop pins 145 on the end support fixtures 100 extend upwards a short distance in order to contact only a portion of the stone workpiece edge. The height of the depth stop pins 145 is preferably selected to allow the saw blade to cut the desired bevel without hitting the depth stop pins 145.

Other methods of providing repeatable miter cut depths may also be used with the miter support system.

FIGS. 1 and 2 have shown two views of an embodiment of an end support fixture 100. The end support fixture 100 depicted is configured to fit onto one end of a stone slab or other workpiece for receiving a miter cut, for example a right-hand end from a vantage point facing the edge of the stone slab that is to be mitered. A second end support fixture 100, configured to be symmetrically reflective of the example depicted in FIGS. 1 and 2, may be used at the left-hand end of the stone slab or other workpiece, and the two end support fixtures 100 may be used together to support the rails of a track saw system at a desired angle with respect to the stone slab workpiece.

Figure 3:
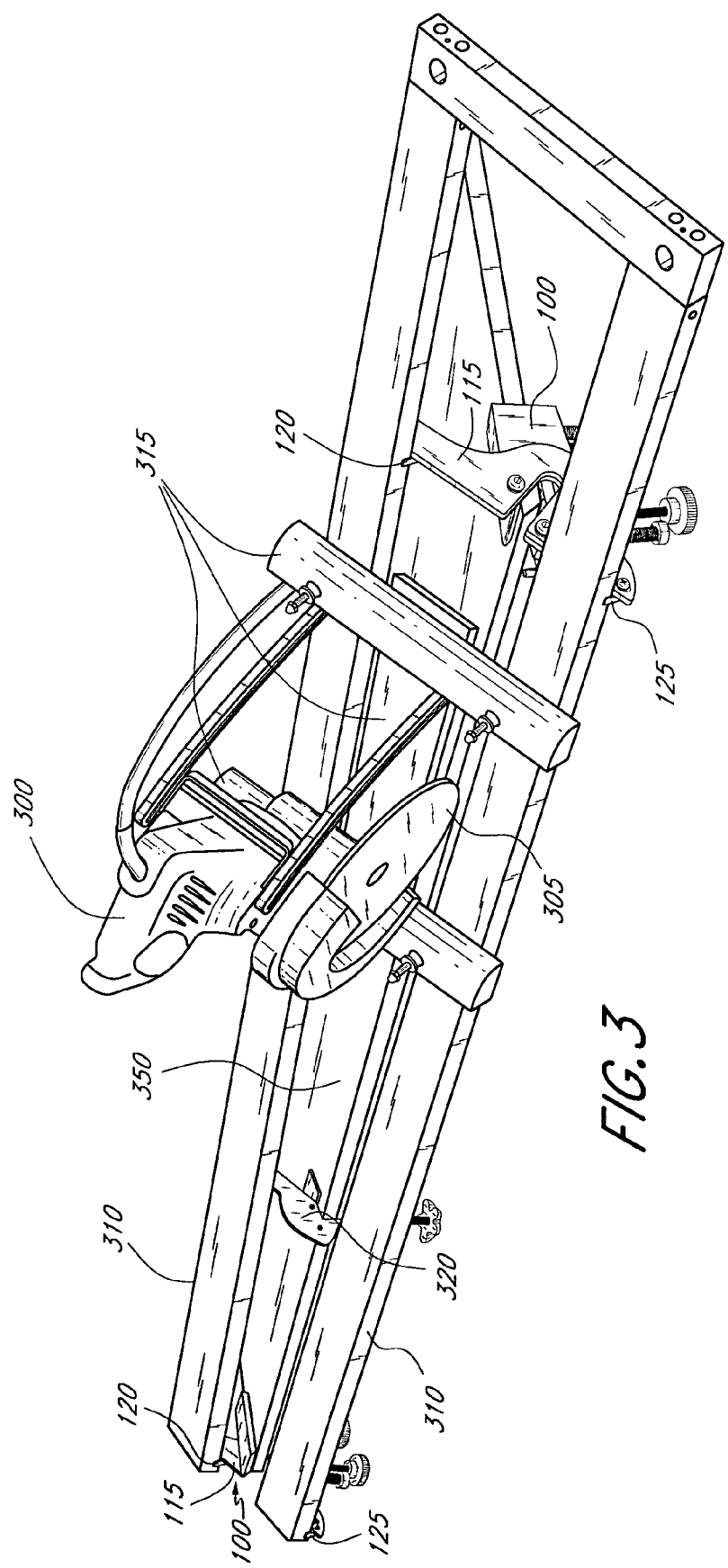
FIG. 3 shows one embodiment of the miter support system in use.

FIG. 3 shows one embodiment of the miter support system in use. Two end support fixtures 100 are clamped onto ends of a stone slab 350 as was described in greater detail with reference to FIG. 2. Lower rail supports 125 on the angled bracket plates 115 of the two end support fixtures 100 support a first rail 310 of a track saw system. Upper rail supports 120 on the angled bracket plates 115 of the two end support fixtures 100 support a second rail 310 of the track saw system. As described in U.S. Pat. No. 5,960,780, the rails 310 may be completely separate from one another or may be joined with a lateral member in one or more locations for form what may be called a "rack" of rails. The miter support system described herein may advantageously be used with rails 310 that are independent of one another, as well as with rails 350 that are joined into racks.

A saw carriage 315, comprising an undercarriage attached to two cross members that are configured to move along the length of the first and second rails 310 on a set of sliders and small wheels (not shown), supports a stone-cutting saw 300 with a diamond blade 305.

The end support fixtures 100 support the rails 310 at an angle of approximately 45° with respect to an upper surface of the stone slab 350. Therefore, the saw 300 and, in particular, the blade 305 of the saw are positioned to make a cut that is at an angle of approximately 45° with respect to the horizontal surface of the stone slab 350 and with respect to a perpendicular vertical surface at a front edge of the stone 350.

When the saw carriage 315 and the saw 300 are positioned at a far left-hand or a far right-hand end of the rails 310 and the blade 305 of the saw 300 is activated, the saw blade slot 130 in the end support fixture 100 allows the blade 305 to pass through the end support fixture 100 and to make the desired miter cut in the edge of the stone slab 350.

In some embodiments, the miter support system may be used in conjunction with a worktable having removable slats. By selectively removing and/or positioning the slats, access may be afforded to difficult-to-reach areas of a stone workpiece and/or additional support may be achieved for mitering small or delicate pieces of stone.

In some embodiments, when the stone slab is very long, such as, for example, over seven feet long, it is desirable to use a track saw system with rails 310 that are accordingly over seven feet long. In such instances, it may be desirable to provide extra support to a central portion of the rails 310 so that the rails may in turn support the saw 300 and the saw carriage 315 without incurring "bowing" or other deformation due to the weight of the saw 300 and saw carriage 315. Thus, as is depicted in the embodiment of FIG. 3, an inline support fixture 320 may be used to provide extra support to a central portion of the first and second rails 310. The inline support fixture 320 will be described in greater detail with reference to FIG. 4. A top-rail support fixture 500, which may also be used to provide additional rail support, will be described in detail with reference to FIG. 5.

Figure 4:
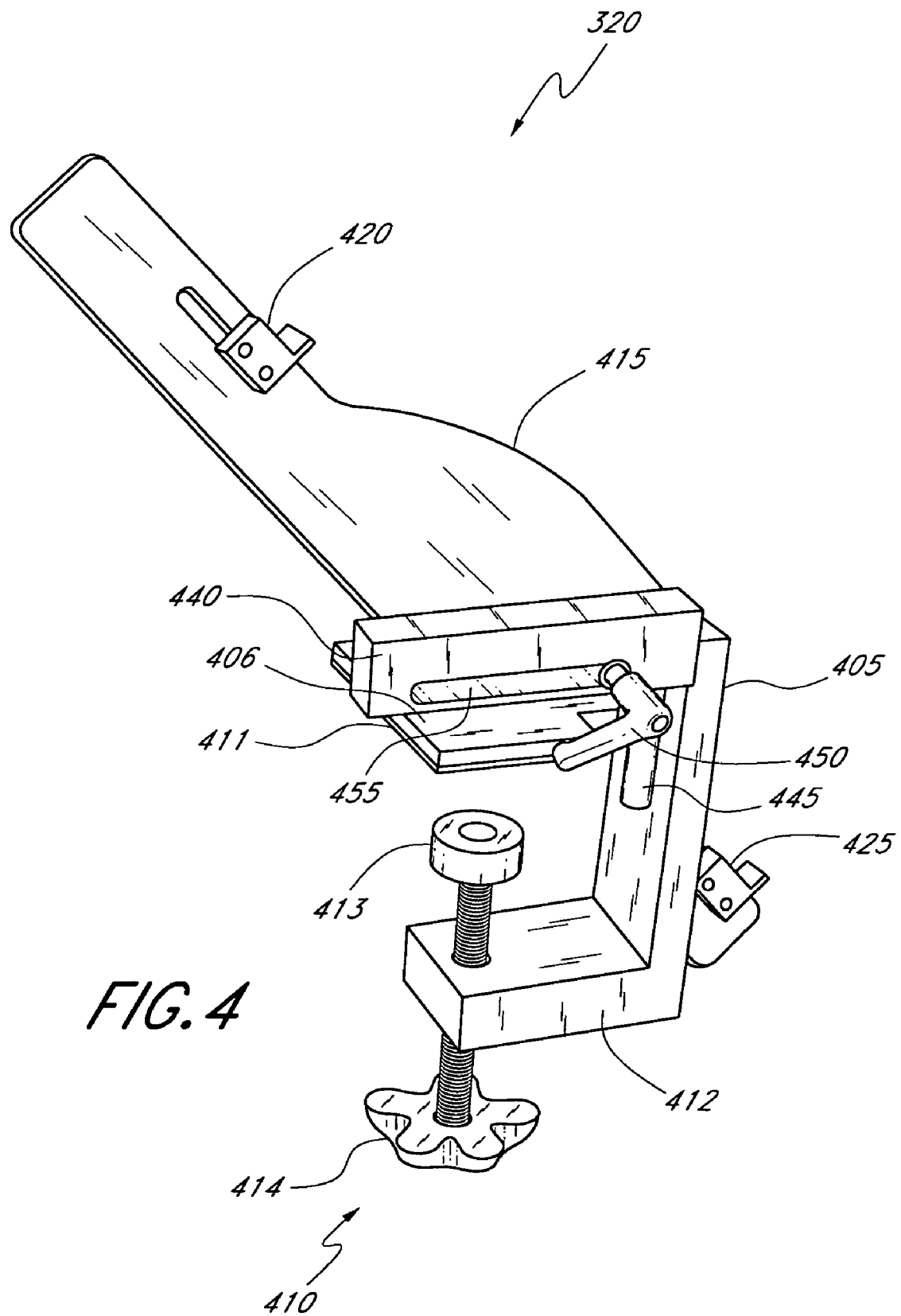
FIG. 4 depicts one embodiment of an inline support fixture for use with the miter support system.

FIG. 4 depicts one embodiment of an inline support 320 for use with the miter support system. While the end support fixtures 100 are configured to abut the left and right ends of the workpiece, the inline support fixture 320 is configured to be clamped to the stone slab 350 at any point along the length of the slab 350.

The inline support fixture 320 includes a fixture support block 405 with an upper support plate 406 that has a thin cushion layer 411 of neoprene or other suitably resilient elastomer or other material. The fixture support block 405 also includes a lower plate 412 with a hole therethrough that accepts a threaded bolt of a screw clamp 410 for clamping the inline support fixture 320 to the slab of stone. As a knob handle 414 of the screw clamp 410 is alternatively tightened or loosened, a clamping head 413 of the screw clamp 410 is respectively clamped up against the underside of the stone slab 350 or released away from the slab 350. Affixed to, or integral with, the fixture support block 405 of the inline support fixture 320 is an angled bracket plate 415 that includes an upper rail support 420 and a lower rail support 425 for supporting central portions of the rails 310 of the track saw system. As depicted in FIG. 4, in some embodiments of the inline support fixture 320, the upper and lower rail supports 420, 425 are adjustable to accommodate track saw systems with rails disposed at varying distances from one another. The upper and lower rail supports 420, 425 are configured to support the rails 310 of the track saw system at the same angle with respect to the stone slab 350 as do the end support fixtures 100, whether for fixed-angle or variable-angle embodiments of the end support fixtures 100.

In the embodiment depicted in FIG. 4, the angled bracket plate 415 does not include a saw blade slot. Thus, the blade 305 of the track saw 300 cannot pass by the inline support fixture 320 as it makes a long mitered cut. Instead, an operator of the saw 300 sawing before reaching the inline support fixture 320, repositions the inline support fixture 320 to be out of the way of the saw blade 305, and continues the cut. Other embodiments may include inline support fixtures 320 that are configured to allow a saw blade 305 to pass by them while making a cut, without repositioning the inline support fixture 320.

As depicted in FIG. 4, in preferred embodiments, to further aid in the proper alignment of the inline support fixture 320 with respect to the stone slab 350 and with respect to the end support fixtures 100, a depth stop mechanism 440, with a downward-projecting depth stop pin 445, a depth stop handle 450, and a depth stop slot 455, allows the inline support fixture 320 to be set to be positioned on the edge of the stone slab 350 in conformity with the end support fixtures 100. The depth stop pin 445 of the inline support fixture 320 may, in some embodiments, be configured to extend across the entire thickness of the stone slab edge, since the saw does not pass the inline support fixture 320 as it makes a mitered cut. Other embodiments may include other types of depth stop mechanisms, or may not include a depth stop mechanism.

The inline support fixture 320 may also be used in situations other than for providing extra support to central sections of very long rails 310 of a track saw system. For example, when a stone slab 350 is cut for building a kitchen counter with an L-shape or a protruding peninsula shape, the stone 350 may not easily provide two suitable end edges for supporting the end support fixtures 100. Thus, using only end support fixtures 100, it may not be possible to support the rails 310 of the track saw system at the desired angle for making the mitered cut. By using an inline support fixture 320 at an inner angle of the stone slab 350, the rails 310 may be properly supported to make the desired cut along a first edge of the inner angle. Repositioning the inline support fixture 320, the end support fixture 100, and the rails 310 of the track saw system, a second mitered cut may be made along a second edge of the inner angle. Typically, only a small portion of the edges at the inner angle will be hand-mitered using a router or other appropriate tool.

Figure 5:
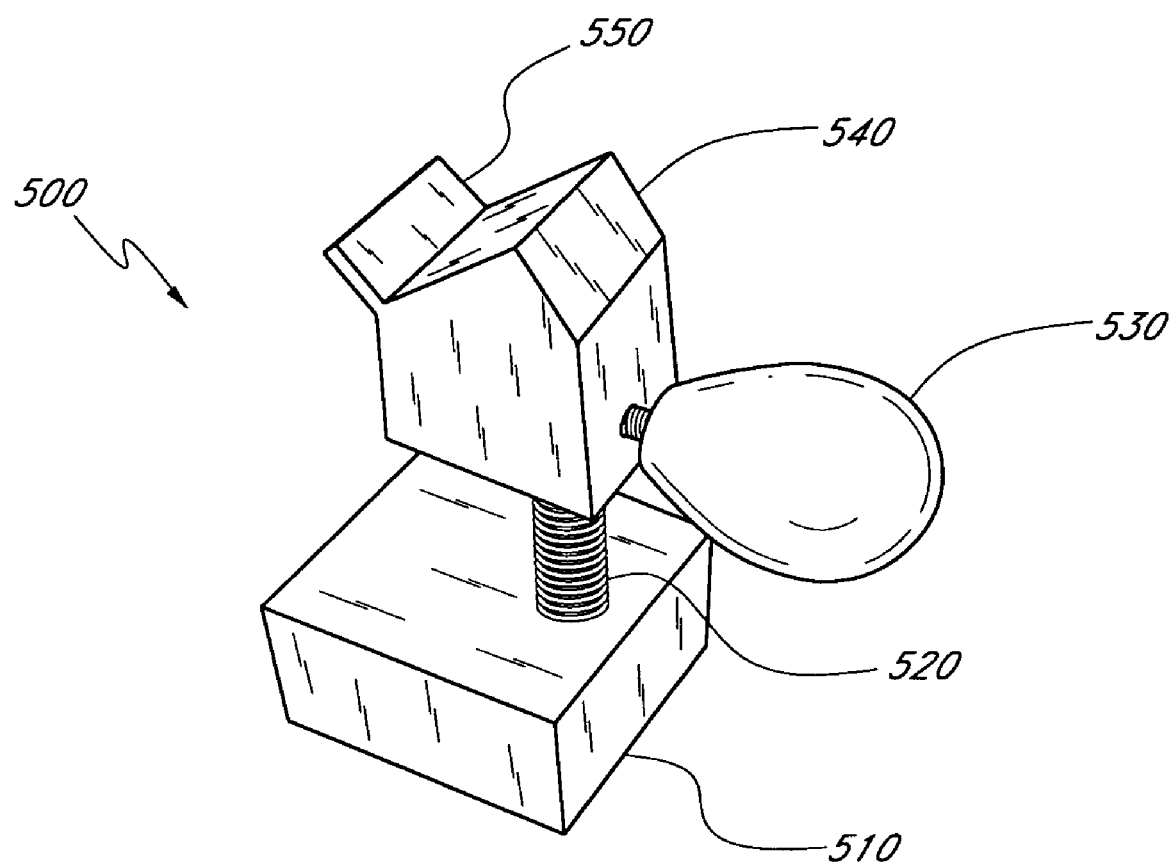
FIG. 5 depicts one embodiment of a top-rail support fixture for use with the miter support system.

FIG. 5 depicts one embodiment of a top-rail support fixture 500 for use with the miter support system. Like the inline support fixture 320, the top-rail support fixture 500 is an optional addition to embodiments of the miter support system that provides extra support for the track saw system. The top-rail support fixture 500 is configured to be supported by the stone slab 350 and to support the upper rail 310 of the track saw system. As depicted in FIG. 5, the top-rail support fixture 500 includes a support base 510 that includes a thin layer of neoprene or other suitable material (not shown) to provide non-skid cushioning for the top-rail support fixture 500 as it sits atop the stone slab 350. The top-rail support fixture 500 also includes a support rod 520 extending up from the support base 510 that has wound about it a spring. An angled support block 540, with an angled support ledge 550, sits atop the support rod 520 and the spring. In the embodiment depicted in FIG. 5, the angled support ledge 550 is configured to support the upper rail 310 of the track saw system at an angle that conforms with the angle of the upper and lower rail supports 120, 125 of the end support fixtures 100. In embodiments where the end support fixtures support the rails 310 at a variable angle, the top-rail support fixture 500 may be configured to likewise support the upper rail 310 at a conforming variable angle.

The angled support block 540 may sit low on the support rod 520, thereby compressing the spring, or may sit higher on the support rod 520, allowing the spring to expand. An adjustment knob 530 may be screwed in to tighten against an upper portion of the support rod 520, thereby fixing the angled support block 540 in position with respect to the support rod 520, and may also be screwed out, loosening the angled support block 540 and allowing it to be re-positioned with respect to the support rod 520. Thus, the angled support block 540 may be positioned to support the upper rail of the track saw system in conformance with the support provided by the end support fixtures 100.

Unlike the inline support fixture 320, the top-rail support fixture 500 allows the blade 305 of the track saw system to pass by the top-rail support fixture 500 as the blade 305 makes the mitered cut. However, also unlike the inline support fixture 320, the top-rail support fixture 500 supports only an upper rail rather than both an upper and a lower rail of the track saw system. Thus, a stone-worker has an option of selecting a desirable aid for providing extra support for the rails of the track saw system, based on the geometry of the stone slab, the characteristics of desired cut, and the available work space.

Although certain embodiments and examples have been described herein, it will be understood by those skilled in the art that many aspects of the methods and devices shown and described in the present disclosure may be differently combined and/or modified to form still further embodiments. Additionally, it will be recognized that the methods described herein may be practiced using any device suitable for performing he recited steps. Such alternative embodiments and/or uses of the methods and devices described above and obvious modifications and equivalents thereof are intended to be within the scope of the present disclosure.

Thus, it is intended that the scope of the present invention should not be limited by the particular embodiments described above, but should be determined only by a fair reading of the claims that follow.

What is claimed is:

1. A guide system for supporting a stone-cutting saw to make mitered cuts in a piece of stone, comprising:
   one or more rails that support said stone-cutting saw and guide the movement of said stone-cutting saw; and
   a fixture system that clamps onto said piece of stone and that supports said one or more rails at an incline with respect to said piece of stone so that said stone-cutting saw can make a mitered cut at a desired angle in said piece of stone as said stone-cutting saw moves along said one or more rails.

2. The guide system of claim 1, where said fixture system comprises a first support for supporting a first end portion of said one or more rails on said piece of stone and a second support for supporting a second end portion of said one or more rails on said piece of stone.

3. The guide system of claim 1, wherein said fixture system comprises at least one support for supporting a central portion of at least one of said rails on said piece of stone.

4. The guide system of claim 1, wherein said fixture system supports at least one of said one or more rails at any of a variety of inclines with reference to a plane defined by said piece of stone, wherein said incline is selectable by a user of said guide system.

5. The guide system of claim 1, wherein said mitered cut is at an incline in the range of 40–50° with reference to a plane defined by said piece of stone.

6. The guide system of claim 5, wherein said incline is in the range of 44°–46°.

7. The guide system of claim 1, wherein said stone is a member of the set consisting of: marble, granite, limestone, sandstone, flagstone, slate, composite stone, and reconstituted stone.

8. An apparatus for guiding a saw along a set of rails to make an angled cut into a stone workpiece, comprising at least one end support fixture configured to clamp onto an edge of said stone workpiece, wherein said end support fixture is further configured to support the set of rails at a desired incline with respect to a plane defined by said stone workpiece, said set of rails for supporting and guiding said saw at a desired angle with respect to the plane of said stone workpiece.

9. The apparatus of claim 8, wherein said stone workpiece is of a material that is a member of the set consisting of: marble, granite, limestone, sandstone, flagstone, slate, composite stone, reconstituted stone, resin, and glass.

10. A set of support fixtures for use with a stone-cutting saw, wherein said stone-cutting saw makes cuts in stone while being guided along a set of rails, and wherein a blade used by said stone-cutting saw is circular and is configured to remain perpendicular with respect to a base of said stone-cutting saw, each on said support fixtures comprising:
    at least one clamp for clamping said support fixture to a piece of stone; and
    at least one support surface for supporting at least one of said rails at an incline with respect to said piece of stone such that said blade of said stone-cutting saw is positioned to make a mitered cut in said piece of stone as said stone-cutting saw is guided along said set of rails.

11. The set of support fixtures of claim 10, wherein said at least one support surface supports said portion of at least one rail at an angle in the range between 40°–50° with respect to a plane of said piece of stone.

12. The set of support fixtures of claim 10, wherein a resilient material is interposed between said at least one support surface and said portion of at least one rail to diminish lateral movement of said rail on said support surface.

13. The set of support fixtures of claim 10, further comprising at least one central support fixture for supporting a central portion of at least one rail.

14. The set of support fixtures of claim 10, wherein at least one of said support fixtures further comprises a depth-stop mechanism for controlling the placement of said mitered cut with respect to a vertical edge of said piece of stone.

15. The set of support fixtures of claim 14, wherein, once said depth-stop mechanism has been set at a desired depth on a first piece of stone, said at least one of said set of support fixtures may be moved to a second piece of stone, said depth-stop mechanism defining said desired depth on said second piece of stone.

16. A method for making a mitered cut in a piece of stone, comprising:
    clamping at least one support fixture onto said piece of stone to support at least a portion of a set of rails, such that said rails are near an edge of said piece of stone and are positioned at an incline with respect to said piece of stone; and
    guiding a stone-cutting saw along said rails such that a blade of said stone-cutting saw is positioned by said incline to make a mitered cut in said edge of said piece of stone.

17. The method of claim 16, further comprising using a depth-matching mechanism to position said mitered cut at a desired distance from said edge.

18. A set of support fixtures for use with a stone-cutting saw, wherein said stone-cutting saw makes cuts in stone while being guided along a set of rails, and wherein a blade used by said stone-cutting saw is circular and is configured to remain perpendicular with respect to a base said stone-cutting saw, each of said support fixtures comprising:
    at least one clamp for clamping said support fixture to a piece of stone; and
    at least one support surface for supporting at least one of said rails at an incline in the range between 40°–50° with respect to said piece of stone such that said blade of said stone-cutting saw is positioned to make a mitered cut in said piece of stone as said stone-cutting saw is guided along said set of rails.

* * * * *

UNITED STATES PATENT AND TRADEMARK OFFICE
CERTIFICATE OF CORRECTION

PATENT NO.          : 7,198,042 B2                                       Page 1 of 1
APPLICATION NO.     : 11/145257
DATED               : April 3, 2007
INVENTOR(S)         : K. Michael Harris It is certified that error appears in the above-identified patent and that said Letters Patent is hereby corrected as shown below:

Column 11, line 57, in Claim 10, after "each" delete "on" and insert -- of --, therefor.

Column 12, line 48 (Approx.), in Claim 18, after "base" insert -- of --.

Signed and Sealed this

Eleventh Day of December, 2007

JON W. DUDAS
*Director of the United States Patent and Trademark Office*